(12) United States Patent
Kelley (10) Patent No.: US 7,978,796 B2
(45) Date of Patent: Jul. 12, 2011

(54) RECOVERING SYMBOLS IN A COMMUNICATION RECEIVER

(75) Inventor: Brian T. Kelley, San Antonio, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 562 days.

(21) Appl. No.: 12/221,548

(22) Filed: Jul. 31, 2008

(65) Prior Publication Data

US 2010/0027727 A1 Feb. 4, 2010

(51) Int. Cl.
*H03D 1/04* (2006.01)
(52) U.S. Cl. ........ 375/346; 375/349; 375/350; 375/262; 375/321; 375/326; 370/286
(58) Field of Classification Search .................. 375/346, 375/350, 349, 344, 262, 321, 326; 370/286
See application file for complete search history.

(56) References Cited

U.S. PATENT DOCUMENTS

| | | | | |
|---|---|---|---|---|
| 5,748,682 A * | 5/1998 | Mobin | ........................... | 375/344 |
| 6,222,891 B1 * | 4/2001 | Liu et al. | ........................ | 375/326 |
| 7,643,577 B2 * | 1/2010 | Lee | ................................ | 375/321 |
| 2002/0141506 A1 * | 10/2002 | Chen | ............................. | 375/262 |
| 2003/0115061 A1 * | 6/2003 | Chen | ............................. | 704/240 |
| 2005/0232174 A1 | 10/2005 | Onggosanusi et al. | | |
| 2008/0159452 A1 * | 7/2008 | Kelley | ........................... | 375/349 |

* cited by examiner

*Primary Examiner* — Eva Y Puente (57) ABSTRACT

Methods of recovering symbols and corresponding communication receivers including dual receivers configured to perform the method, where the method comprises: sampling a received signal that includes interference to provide received samples; determining a plurality of high power symbols and determining alternate symbols for a portion of the plurality of high power symbols based on the received samples and based on known training symbols; and deriving a sequence of recovered symbols corresponding to the received samples based on the received samples and augmented training symbols, the augmented training symbols comprising the known training symbols augmented by the plurality of high power symbols with one or more alternate symbols replacing a corresponding one or more high power symbols.

20 Claims, 6 Drawing Sheets

RECOVERING SYMBOLS IN A COMMUNICATION RECEIVER

FIELD OF THE INVENTION

This invention relates in general to communications and more specifically to methods and apparatus for recovering symbols in a communication receiver.

BACKGROUND OF THE INVENTION

Communication systems and receivers are known and advanced techniques exist for receiving and recovering symbols, which have been transmitted or sent to such receivers. Many present systems are interference limited or in many situations may be interference limited rather than noise limited. Channels over which symbols are sent are subject to various anomalies including interference and anomalies in a transmitter or receiver. Interference can include noise and adjacent channel interference as well as co-channel or on-channel interference. Adjacent channel interference is the result of transmissions on adjacent channel and results from limited adjacent channel rejection in a receiver. Co-channel interference may be the result of on channel transmissions from nearby transmitters, e.g., in geographically adjacent cells or coverage areas, and channel fading due to, e.g., Doppler shift.

Often symbol recovery in modern communication receivers utilizes channel estimation techniques. Air interface protocols often include training symbols to facilitate, e.g., channel estimation. Channel estimation is usually resource intensive and may not work particularly well in some situations, e.g., strong carrier to interference ratios. Furthermore, the number of training symbols as a percentage of total symbols is a tradeoff with payload (information bearing symbols). In many situations, e.g., rapidly varying channel characteristics, the number of training symbols may not be sufficient to provide good symbol recovery. Moreover and as known, improvements in symbol recovery error rates, generally translate into increased system capacity.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

In overview, the present disclosure concerns communications, e.g., radio frequency communication over a channel, and more specifically techniques and apparatus for recovering symbols that are arranged and constructed for improving error rates in complex channels. More particularly various inventive concepts and principles embodied in methods and apparatus for recovering symbols using augmented training symbols, e.g., known symbols augmented by additional symbols, and approaches for selecting the augmented training symbols for use in symbol recovery will be discussed and disclosed.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by software or firmware. It is expected that one of ordinary skill, notwithstanding possibly significant effort and many design choices motivated by, for example, available time, current technology, and economic considerations, when guided by the concepts and principles disclosed herein will be readily capable of generating or selecting such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
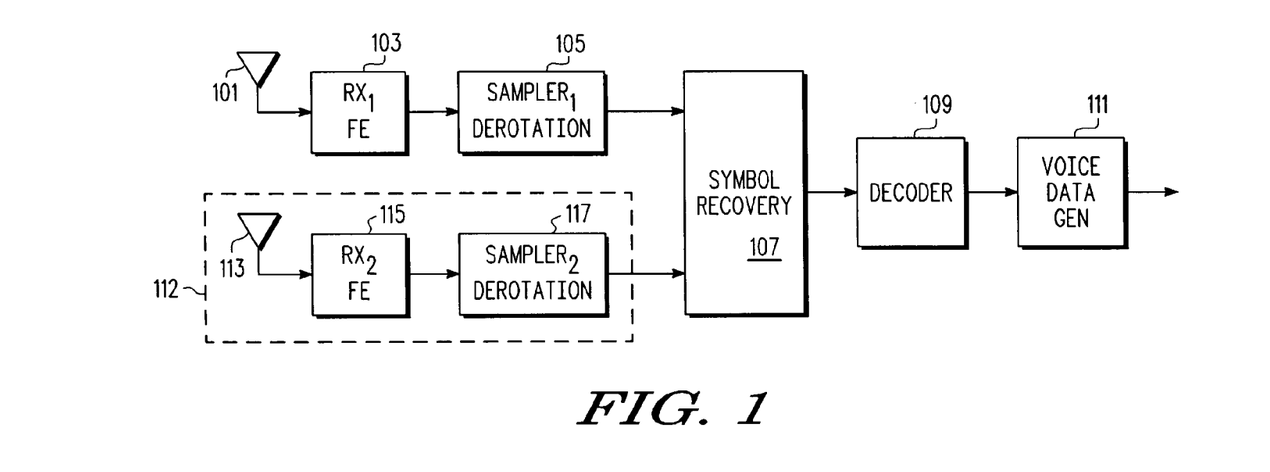
FIG. 1 depicts in a simplified and representative form, a high level diagram of a receiver in accordance with one or more embodiments.

Referring to FIG. 1, a simplified and representative high level diagram of a receiver in accordance with one or more embodiments will be briefly discussed and described. FIG. 1 illustrates a basic receiver suitable for using the novel methods and apparatus for recovering symbols, which methods and apparatus will be further described below. The receiver of FIG. 1, illustrates a wireless receiver and shows an antenna 101 coupled to a receiver front end 103 which as will be appreciated typically includes some radio frequency selectivity, a low noise amplifier, local oscillator frequency generation, complex mixer for frequency translation to baseband, baseband gain, and baseband selectivity. The front end 103 provides a received signal together with interference (noise, co-channel, adjacent channel, etc.), where the received signal was absorbed by the antenna and then frequency translated to baseband via the complex mixer. The received signal with interference from the receiver front end will be a complex signal with in-phase and quadrature components (I and Q signals). In applications other than wireless, e.g., high frequency cable, etc, the antenna would be replaced with a suitable interface to the appropriate medium carrying the radio frequency signal.

The receiver front end is coupled to a sampler function 105 that operates to provide complex (in-phase and quadrature) samples of the baseband signal or received signal including interference. The sampler provides received samples at a rate that is typically equal to a multiple of the symbol rate, e.g., 1 or 2 times the symbol rate. The sampler 105 may also include a derotation operation or derotator depending on the applicable standards for the modulation that is employed. For example, in systems using EDGE (Enhanced Data rates for GSM Evolution) the air interface standards use a π/2 rotation wherein each successive symbol undergoes an additional π/2 rotation prior to transmission. The derotator, if needed, removes this rotation from successive symbols.

The received samples of the received signal including interference (after derotation as needed) are provided to a demodulator or symbol recovery function 107 or operation which provides recovered symbols (described in detail below) to a decoder 109. The decoder 109 applies error decoding or correction to the recovered symbols, where the decoding will vary in accordance with the coding used for the transmitted date, i.e., in accordance with relevant standards. The output (bits) from the decoder 109 is provided to a voice/data generator 111, e.g., vocoder, application, etc., where it is converted to usable form.

Some embodiments include an additional (one or more) set 112 (one shown) of an antenna 113 or other channel interface, a receiver front end 115, and a sampler 117 all intercoupled and operating as discussed above. Each additional set provides additional received samples of the received signal including interference to the symbol recovery function 107. This allows and facilitates utilization of the present inventive symbol recovery techniques and apparatus in a diversity or MIMO (multiple input multiple output) receiver.

Figure 2:
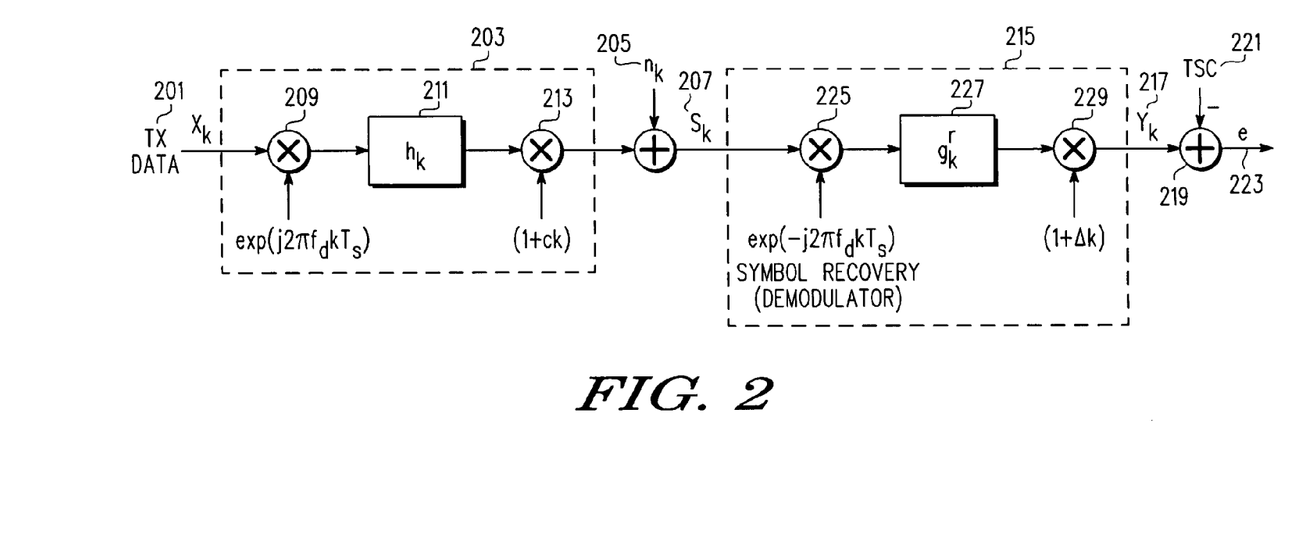
FIG. 2 in a representative form, shows a diagram of a model of a channel over which data may be transmitted, etc., and further illustrates various symbol recovery issues in a single receiver approach.

Referring to FIG. 2, a representative diagram of a model of a channel over which data may be transmitted or transported, etc. is shown. FIG. 2 also illustrates various symbol recovery issues in a single receiver approach and will be briefly discussed and described. FIG. 2 illustrates transmit data, $x_k$, 201 applied to or transmitted through a non-stationary channel 203 with noise added 205 to the resultant signal from the channel to provide the received signal including interference, $s_k$, 207. The non-stationary channel includes a Doppler shift via multiplier 209 (frequency shift due to multi-path fading), an impulse response, $h_k$ via filter 211 (frequency selective filter), and a time varying channel gain via multiplier 213. Note that the non-stationary channel model is a discrete time model with a time index of k. It will also be appreciated that FIG. 2 ignores without loss of generality, any frequency translation or conversion, filtering, sampling, or other processing normally associated with a transmitter and receiver. With this model the received signal $s_k$ 207, can be represented by:

$$s_k = (1 + ck) \sum_{m=0}^{N_v-1} h_m x_{k-m} \exp(j2\pi f'_d [k-m] T_s) + n_k$$

where Nv is the delay spread in samples at a particular sample rate (i.e., a measure of channel memory) and Ts is the symbol period. For a given point in time, i.e., k, this can be written in matrix form as:

$$\begin{bmatrix} s_k \\ s_{k-1} \\ \vdots \\ s_{k-N+1} \end{bmatrix} = \begin{bmatrix} (1+ck)\exp(j2\pi f_d kT_s)x_k & \exp(j2\pi f_d[k-1]T_s)x_{k-1} & \cdots & \exp(j2\pi f_d[N_v-1]T_s)x_{k-N_v+1} \\ (1+c(k-1))\exp(j2\pi f_d[k-1]T_s)x_{k-1} & \exp(j2\pi f_d[k-2]T_s)x_{k-2} & \cdots & \exp(j2\pi f_d[N_v-2]T_s)x_{k-N_v} \\ \vdots & \vdots & \ddots & \vdots \\ (1+c[k-N+1])\exp(j2\pi f_d[k-N+1]T_s)x_{k-N+1} & \exp(j2\pi f_d[k-N]T_s)x_{k-N} & \cdots & \exp(j2\pi f_d[N_v-N]T_s)x_{k-N-N_v+2} \end{bmatrix} \begin{bmatrix} h_0 \\ h_1 \\ h_2 \\ \vdots \\ h_{N_v-1} \end{bmatrix} + \begin{bmatrix} n_k \\ n_{k-1} \\ n_{k-2} \\ \vdots \\ n_{k-N+1} \end{bmatrix}$$

or in matrix form:

$$S = CX_d h + n$$

Given the received signal with interference, symbol recovery function 215 or demodulator is configured for symbol recovery, which is performed on the received signal with interference $s_k$ 207 or a portion thereof such that the resultant recovered symbols $y_k$ 217 when compared 219 to a known training symbol sequence 221 yields an error 223 that is acceptable, e.g., yields a MMSE (Minimum Mean Square Error). As will be more fully discussed, this requires estimating one or more of a frequency shift (Doppler), a channel delay and channel response, and gain. These parameters are reflected or accounted for in FIG. 2 as, respectively, a multiplier 225, a filter 227 or interference canceling filter with coefficients $g_k^r$ (where r identifies a receiver or set), and a multiplier 229. As will be more fully described below, by appropriately selecting the filter coefficients $g_k^r$, and possibly other parameters, e.g. Doppler shift term $f_d$ and gain $\Delta_k$, the performance of the symbol recovery function can be dramatically improved.

Figure 3:
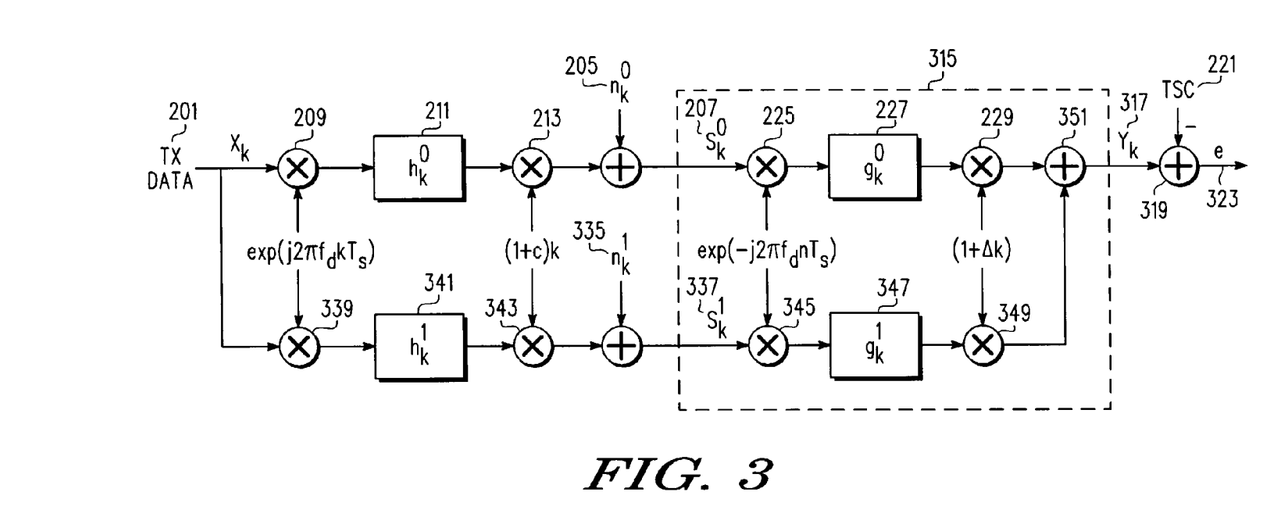
FIG. 3 in a representative form shows a diagram of a model of a channel over which data may be transmitted, etc. and further illustrates various symbol recovery issues in a diversity receiver approach.

In matrix form the input to the filter 227, the output of the multiplier 229, and the optimum filter coefficients can be represented, respectively, by the three following equations:

$$S_d = S(f = f_d)$$

$$Y = \Delta S_d g$$

$$g_{mmse\_opt} = [(\Delta S_d)^H (\Delta S_d)]^{-1} (\Delta S_d)^H T_{sc}$$

where superscript H denotes Hermitian operator (resulting in a matrix with rows of elements where each element is the complex conjugate of the corresponding column element in the original matrix). In an expanded form Y is:

transmit data, $x_k$, 201 applied to or transmitted through the first channel as well as a second non-stationary channel with noise added 335 to the resultant signal from the channel to provide the received signal including interference $S_k^1$ 337. The second non-stationary channel includes a Doppler shift via multiplier 339 (frequency shift due to multi-path fading which is the same shift for channel 1 and 2), an impulse response, $h_k^1$ via filter 341 (frequency selective filter), and a time varying channel gain via multiplier 343 (same gain variation as channel 1).

Given the received signals with, respective, interference, symbol recovery or demodulation is performed, via symbol recovery function or demodulator 315, on the received signals $S_k^0$ 207 and $S_k^1$ 337 or appropriate portions thereof such that the resultant recovered symbols $y_k$ 317 when compared 319 to a known training symbol sequence 221 yields an error 323 that is acceptable, e.g., yields a MMSE (Minimum Mean Square Error). As noted above and more fully discussed below, this requires estimating one or more of a frequency shift (Doppler), a channel delay and channel response (now for two or more channels), and gain. These parameters are reflected or accounted for in FIG. 3 as the functions noted above with reference to FIG. 2 and additionally for the second channel, respectively, a multiplier 345, a filter 347 or interference canceling filter with coefficients $g_k^1$ (where 1 identifies second receiver), and a multiplier 349. The outputs of multiplier 229 from the first receiver and the output of multiplier 349 from the second channel are added together at adder 351 with the output from the adder being $y_k$ 317. As will be more fully described below, by appropriately selecting the filter coefficients $g_k^0$, $g_k^1$ and possibly other parameters, e.g. Doppler shift term $f_d$ or gain $\Delta_k$, the performance of the symbol recovery function can be dramatically improved.

$$\begin{bmatrix} y_k \\ y_{k-1} \\ \vdots \\ y_{k-N+1} \end{bmatrix} = \begin{bmatrix} (1+\Delta k) & 0 & 0 & 0 & 0 \\ 0 & (1+\Delta[k-1]) & 0 & 0 & 0 \\ 0 & 0 & \ddots & 0 & 0 \\ 0 & 0 & 0 & 0 & 0 \\ 0 & 0 & 0 & 0 & (1+\Delta[k-N+1]) \end{bmatrix} \times$$

$$\begin{bmatrix} \exp(-j2\pi f_d k T_s) s_k & \exp(-j2\pi f_d [k-1] T_s) s_{k-1} & \ldots & \exp(-j2\pi f_d [k-N_v+2] T_s) s_{k-N_v+2} & \exp(-j2\pi f_d [k-N_v+1] T_s) s_{k-N_v+1} \\ \exp(-j2\pi f_d [k-1] T_s) s_{k-1} & \exp(-j2\pi f_d [k-2] T_s) s_{k-2} & \ldots & \exp(-j2\pi f_d [k-N_v+1] T_s) s_{k-N_v+1} & \exp(-j2\pi f_d [k-N_v] T_s) s_{k-N_v} \\ \vdots & \vdots & \ddots & \vdots & \vdots \\ \exp(-j2\pi f_d [k-N+1] T_s) s_{k-N+1} & \exp(-j2\pi f_d [k-N] T_s) s_{k-N} & \ldots & \exp(-j2\pi f_d [k-N-N_v+3] T_s) s_{k-N-N_v+3} & \exp(-j2\pi f_d [k-N-N_v+2] T_s) s_{k-N-N_v+2} \end{bmatrix}$$

$$\begin{bmatrix} g_0 \\ g_1 \\ g_2 \\ \vdots \\ g_{N_v-1} \end{bmatrix}$$

Referring to FIG. 3, a representative diagram of a model of a channel over which data may be transmitted or transported, etc. is shown. FIG. 3 also illustrates various symbol recovery issues in a dual or diversity receiver approach and will be briefly discussed and described. As noted with reference to FIG. 2, various functionalities of known transmitters and receivers are not shown in FIG. 3. FIG. 3 essentially shows all of the functional blocks and data terms of FIG. 2, however a superscript 0 has been added to various terms, e.g., $h_k$, etc., where the 0 denotes a first channel and receiver or set. Similarly a superscript 1 denotes a second channel and receiver or set, etc. FIG. 3 shows the transmit data or symbols 201 applied to a second non-stationary channel. FIG. 3 illustrates The equations below can be used to describe in matrix form, respectively, the outputs $S_d^0$, $S_d^1$, from multipliers 225, 345, the output Y from adder 351, and the optimum filter coefficients, $g_{div\_mmse\_opt}$, for filters 227, 347.

$$S_d^0 = S^0(f + f_d), \quad S_d^1 = S^1(f + f_d) \qquad \text{Eq. 1}$$

$$Y = \Delta S_d^0 g^0 + \Delta S_d^1 g^1 = [\Delta S_d^0 \Delta S_d^1] \begin{bmatrix} g^0 \\ g^1 \end{bmatrix} \qquad \text{Eq. 2}$$

-continued $$g_{div\_mmse\_opt} = \left([\Delta S_d^0 \Delta S_d^1]^H [\Delta S_d^0 \Delta S_d^1]\right)^{-1} ([\Delta S_d^0 \Delta S_d^1])^H T_{sc} \quad \text{Eq. 3}$$

Where $([\Delta S_d^0 \ \Delta S_d^1])$ is a matrix, where the rows contain samples from the first receiver followed by samples from the second receiver with the samples possibly modified in accordance with a corresponding frequency shift (indicated by subscript d) and gain change (Δ). The number of samples in a row from each receiver will equal the number of filter coefficients, G, for its, respective, filter 227, 347. As is known, if the delay spread of a channel or expected delay spread is X (e.g., 4 micro seconds) then the number of coefficients or filter taps need to cover in time approximately 2X (e.g., 8 micro seconds) and thus will depend on the expected delay spread as well as sampling rate. These samples will include from the first receiver a present sample (possibly modified) in the first position followed successively by earlier samples for a total of G samples and these will be followed by, from the second receiver, a present sample and successively earlier samples for a total of G samples. Thus, the total number of samples in a row of the matrix will be 2G. The number of rows will vary depending on the present task. For example, to determine the optimum filter coefficients, $g_{div\_mmse\_opt}$, given training symbols $T_{SC}$, the number of training symbols $T_{SC}$ will determine the number of rows in the matrix. To recover the appropriate data symbols the number of samples corresponding to data will determine the number of rows. The optimum filter coefficients, $g_{div\_mmse\_opt}$, is a column vector 2G in length, where the first G elements are the coefficients for the first filter 227 and the last G elements are the coefficients for the second filter 347.

Figure 4:
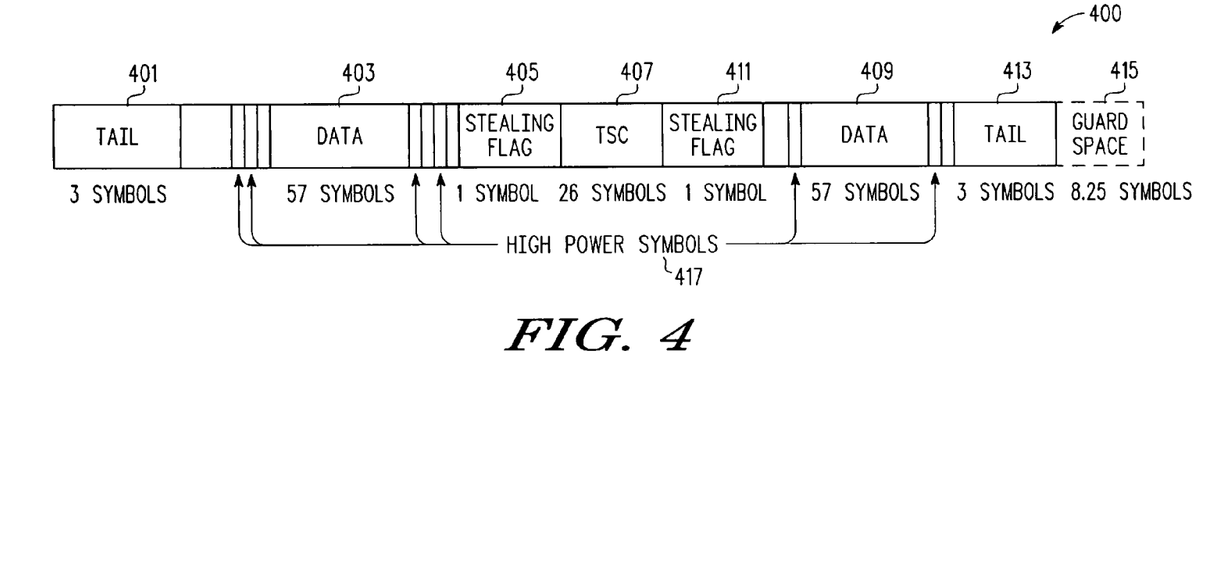
FIG. 4 depicts a representative data packet for one air interface protocol, which is used to illustrate various principles in accordance with one or more embodiments.

Referring to FIG. 4, a representative data packet (not drawn to scale) for one air interface protocol and the corresponding bit or symbol allocation, which will be used to illustrate various principles in accordance with one or more embodiments, will be discussed and described. The particular data packet in FIG. 4 is a data packet or burst 400 for EDGE (Enhanced Data rates for GSM Evolution, where GSM is an acronym for the Global System for Mobile Communications) systems. It is understood that other systems and air interface standards may have other burst or packet structures and allocation maps. As is known and specified in the various air interface standards for EDGE systems, 8 bursts or packets comprise one Time Division Multiplex Access (TDMA) frame, which is transmitted via one radio frequency carrier. Different TDMA frames may be frequency hopped on different radio frequency carriers. Twenty-six (26) TDMA frames comprise one multiframe. Fifty-one multiframes are included in a superframe and 2048 superframes are included in a hyperframe.

The EDGE burst occupies or has a duration of or spans 156.25 symbol periods or 156.25 bit periods or bit times at 1 bit per symbol. In EDGE, each symbol period is equivalent to 577 micro-seconds. As shown, the EDGE burst includes and spans 3 tail bits 401, a first data field 403 that includes or spans 58 bits including a stealing flag 405, a training sequence 407 of 26 bits, a second data field 409 that includes or spans 58 bits including a second stealing flag 411, 3 more tail bits 413, followed by a gap 415 equivalent to 8.25 bit times. Also shown is a plurality of high power symbols or bits (e.g., six) 417.

Figure 5:
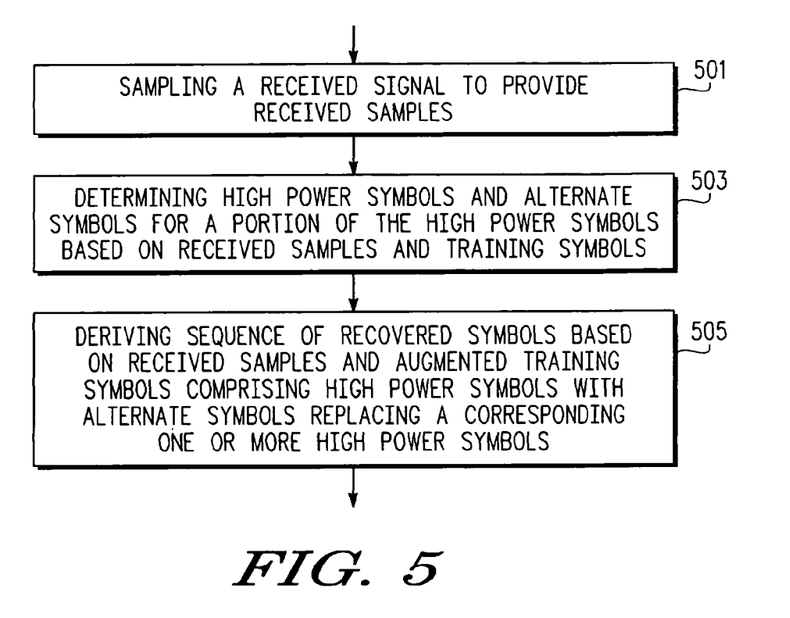
FIG. 5 shows a flow chart illustrating representative methods of recovering symbols in a receiver in accordance with one or more embodiments.

Referring to FIG. 5, a flow chart, which illustrates representative methods of recovering symbols in a receiver in accordance with one or more embodiments, will be discussed and described. As will be further described the methods of FIG. 5 can be implemented with generally known hardware such as appropriate samplers and processors, e.g., digital signal processors or the like executing software instructions suitable to perform the tasks as further described below. Generally the methods illustrated can be repeated as needed to recover symbols, e.g., the method can be repeated for each data packet or frame.

The methods of FIG. 5 show an approach or methods of recovering symbols in a communication receiver where the flow chart and process begins by sampling a received signal that includes interference to provide received samples 501. Other than the sampling, the process of FIG. 5 and other processes subsequently discussed can be performed by a demodulator or symbol recovery function 107 configured for performing the various functions or other apparatus with appropriate functionality. The demodulator or symbol recovery function 107, 215, 315 can be implemented with a commonly available digital signal processor (DSP) with appropriate capabilities (processing capability, memory and so on) executing software or firmware and configured for performing the requisite processes as further described herein or a combination of other hardware, software, etc.

Given the samples and known training symbols, determining a plurality of high power symbols and determining alternate symbols for a portion of the plurality of high power symbols based on the received samples and based on known training symbols is performed 503. Various embodiments for doing the determining process will be discussed and described below. As will be further discussed below and from the high power and alternate symbols or portions thereof, the method includes deriving a sequence of recovered symbols corresponding to the received samples based on the received samples and augmented training symbols 505. The augmented training symbols comprise or include the known training symbols (see, e.g., 407, 401, 413) augmented by the plurality of high power symbols 417 with one or more alternate symbols replacing a corresponding one or more high power symbols. The FIG. 5 method and one or more of the other methods discussed below can be performed on each packet or other data unit as they are received.

Figure 6:
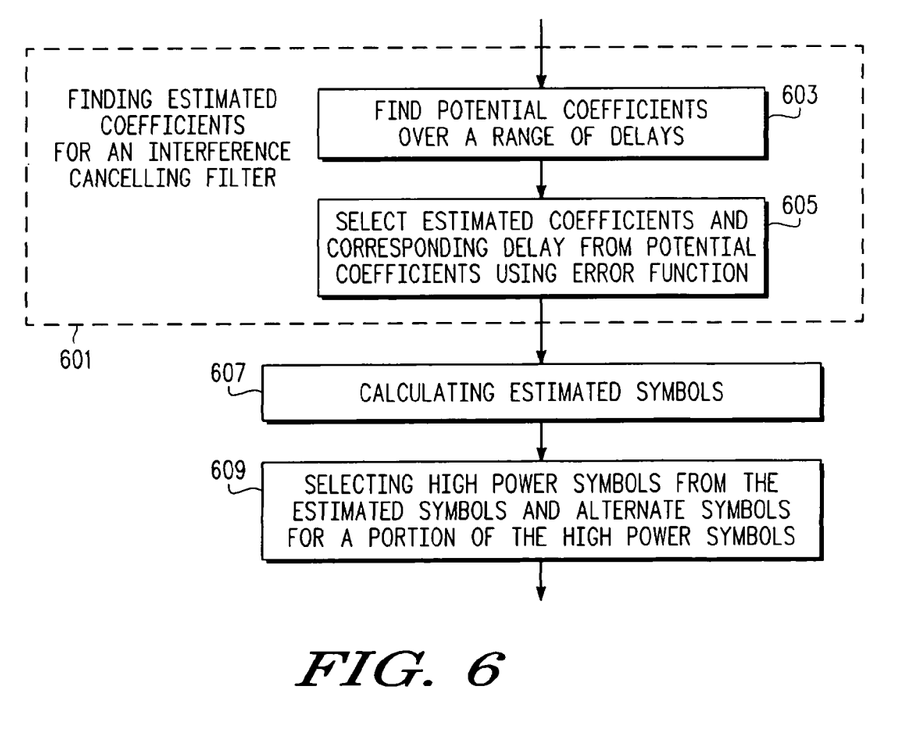
FIG. 6 shows a flow chart illustrating representative and more detailed methods associated with, e.g., the FIG. 5, methods of recovering symbols in a receiver in accordance with one or more embodiments.

Referring to FIG. 6, a flow chart illustrating representative and more detailed methods associated with, e.g., the FIG. 5, methods of recovering symbols in a receiver in accordance with one or more embodiments, will be discussed and described. More specifically FIG. 6 illustrates one embodiment in more detail for determining high power symbols and alternate symbols as briefly discussed with reference to FIG. 5. FIG. 6 starts at 601 and shows finding estimated coefficients for an interference cancellation filter, where as will become evident the estimated coefficients are based on a best delay or delay estimate. This is accomplished based on a portion of the received signal samples and known training symbols, with the portion of the received samples corresponding to the known training symbols.

As indicated, finding the estimated coefficients can further comprise, at 603, finding potential coefficients for an interference cancellation filter for each delay of a range of delays using a corresponding portion of the received signal samples, with the corresponding portion of the received signal samples based on a respective delay and the known training symbols and, at 605, selecting, from the potential coefficients, the estimated coefficients for the interference cancellation filter in accordance with an error function.

When a packet is received and sampled, such as the packet in FIG. 4 you need to select the portion of those received samples that correspond to the training symbols 407 as well as the tail symbols 401, 413 and using this portion of the received samples and the known training symbols (the tail symbols are known symbols and can be used as additional known training symbols) determine appropriate coefficients for an interference cancelling filter, e.g., filters 227, 347. Such a filter can be referred to as a Weiner filter. As a simple example assuming a known or 0 delay and supposing one sample per symbol, you would select the first 3 samples, the middle 26 samples and the last 3 samples as the portion of the received samples to use in finding estimated coefficients. The problem with this simple example, is you do not know what the path delay is and thus do not know exactly which samples to select. Thus, we find potential coefficients for each delay over a range of delays, e.g., +/−4-5 symbols, from our last time reference or initial time estimate and then test each set of potential coefficients until a set of the potential coefficients operating on the corresponding portion of received samples provides the best estimate or best error given an error function.

Mathematically for the diversity receiver of FIG. 3, 601 or 603, 605 can be represented by the following equations:

$$\begin{bmatrix} g_0^d \\ g_1^d \end{bmatrix}_{2G} = \left( [S_{0dr}^d | S_{1dr}^d]_{2G,32}^H [S_{0dr}^d | S_{1dr}^d]_{32,2G} \right)^{-1} [S_{0dr}^d | S_{1dr}^d]_{2G,32}^H \overline{T}_{sc_{32}} \quad \text{Eq. 4}$$

$$E^d = \overline{T}_{sc_{32}} - [\hat{T}_{sc_{32}}^d] = \overline{T}_{sc_{32}} - [S_{0dr}^d | S_{1dr}^d]_{32,2G} \begin{bmatrix} g_0^d \\ g_1^d \end{bmatrix} \bigg| d_{opt} = \min_d \{E^d\} \quad \text{Eqs. 5}$$

Eq. 4 is similar to Eq. 3 above with the coefficient column vector explicitly shown and the d superscript referring to a given delay. The known training symbols, $T_{sc}$, is shown as a 32 element column vector comprising in one embodiment for the EDGE burst or packet in FIG. 4, the 26 training symbol sequence 407 as well as the 3 leading tail symbols 401 and 3 ending tail symbols 413. In general this will be a column vector of known training symbols, i.e., a column vector with all known symbols for the particular packet structure.

To find potential coefficients 603, in one embodiment, use Eq. 4. In general for a given delay, d, or time reference, select appropriate samples (i.e., the sample that will correspond to each of the training symbols for a given time reference or delay) to provide the matrix $$[S_{0dr}^d | S_{1dr}^d]_{32,2G},$$

where these samples are selected from the first and second receivers as discussed above; given the matrix, find the potential coefficients, i.e., coefficient column matrix from Eq. 4 for the associated delay; and repeat the matrix formulation and finding potential coefficients from Eq. 4 processes for each delay over a delay dimension or range of delays, e.g., 4-5 symbols. Selecting estimated coefficients 605, in one embodiment uses Eq. 5. For each of the potential coefficients (each of the coefficient column matrixes or set of potential coefficients), calculate the error term, $E^d$, from Eq. 5 and repeat this for each of the coefficient column matrixes or sets of potential coefficients. In one embodiment, we select estimated coefficients 605 from Eq. 5 as the coefficient column matrix with the minimum or best error, $E^d$, and the optimum or best delay or time reference is the delay associated with or corresponding to this set of coefficients or coefficient column matrix. The $\{E^d\}$ Eqs. 5 denotes a magnitude which may be a sum of the magnitudes or sum of squared magnitudes of all elements of $E^d$, where it will be appreciated that the elements are complex and thus the square of the magnitude of an element is the sum of the real part squared plus the imaginary part squared.

Given the estimated coefficients, calculating estimated symbols 607 or a sequence of estimated symbols is performed. In one embodiment, this can be done using Eq. 2 or an appropriate form thereof. In this instance, the estimated symbols can be calculated using:

$$I = [S_{0dr}^d | S_{1dr}^d]_{116,2G} \begin{bmatrix} g_0^d \\ g_1^d \end{bmatrix}_{2G}, \quad \text{Eq. 6}$$

where I is a 116 symbol column matrix comprising an estimated symbol for each of the data (with stealing flag) fields 403, 409 of FIG. 4. In this instance the sample matrix is comprised of 116 rows of received samples with each row including, for the associated symbol (i.e., first row is first symbol), a present sample plus G-1 sequentially previous samples from the first receiver followed by a present sample plus G-1 sequentially previous samples from the second receiver. The coefficient column matrix can be the matrix of estimated coefficients found from Eq. 4 and Eqs. 5.

Given the estimated coefficients or sequence of estimated coefficients, the process of FIG. 6, 609 includes selecting a plurality of high power symbols from the estimated symbols and selecting alternate symbols for a portion of the plurality of high power symbols. Various combinations of the high power and alternate symbols will be used to augment or add to the known training symbols to provide augmented training symbols for use in deriving the sequence of recovered symbols. This is shown in somewhat more detail in FIG. 7.

Figure 7:
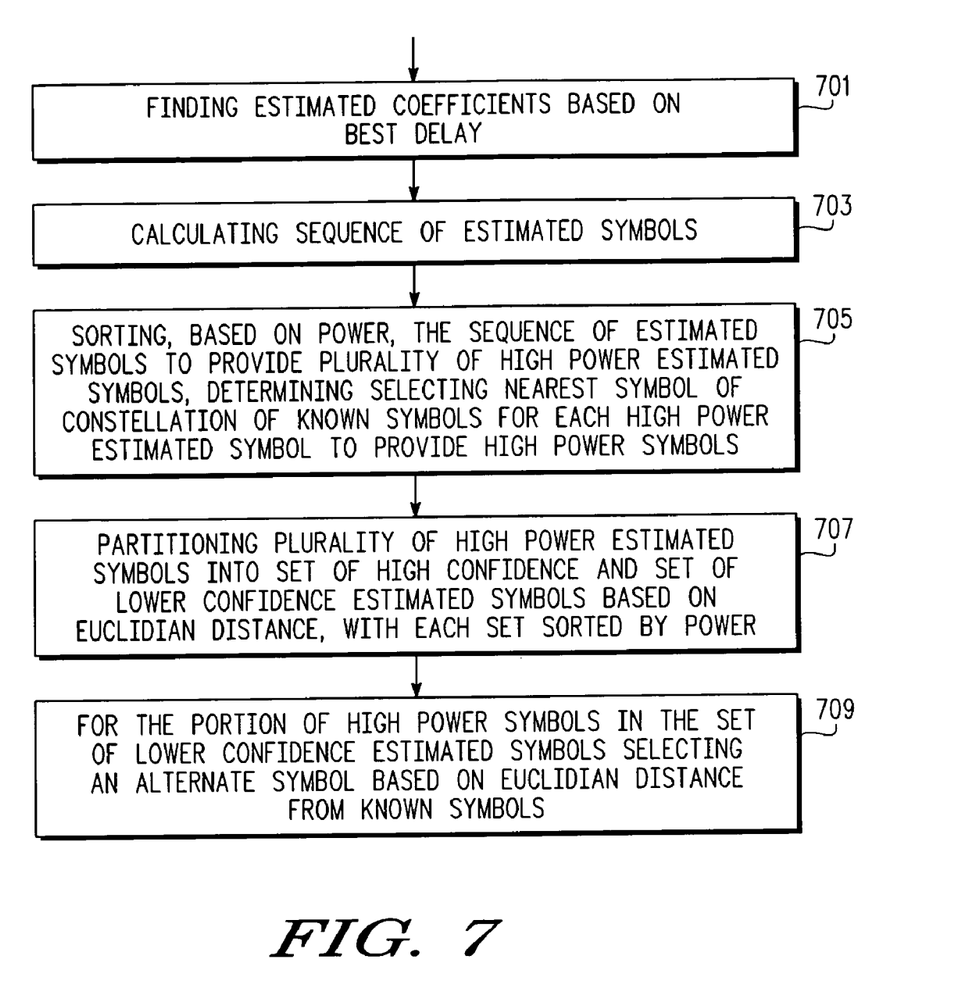
FIG. 7 shows a flow chart illustrating representative and more detailed methods associated with, e.g., the FIG. 5, methods of recovering symbols in a receiver in accordance with one or more embodiments.

Referring to FIG. 7, a flow chart illustrating representative and more detailed methods associated with, e.g., the FIG. 5, methods of recovering symbols in a receiver in accordance with one or more embodiments, will be discussed and described. More specifically FIG. 7 illustrates one embodiment in more detail for determining high power symbols and alternate symbols as briefly discussed with reference to FIG. 5 and FIG. 6. FIG. 7 starts at 701 and shows finding estimated coefficients for an interference cancellation filter, where the estimated coefficients are based on a best delay or delay estimate and this process is analogous to FIG. 6, 601. At 703, which again can be analogous to FIG. 6, 603, calculating a sequence of estimated symbols is shown where the calculation is based on the received samples and the estimated coefficients.

The process of FIG. 7 next illustrates 705 sorting, based on power, the sequence of estimated symbols to provide a plurality of high power symbols. More specifically the sorting provides a plurality of high power estimated symbols from which the nearest symbol of the constellation of known symbols can be determined and selected for each of the high power estimated symbols and this set of nearest known symbols can be a plurality of or set of high power symbols. In one embodiment, the squared magnitudes or power of the estimated symbols or elements of I from Eq. 6 are sorted by magnitude or magnitude squared and the largest or highest power A=M+L elements (see, e.g., 417) can be selected. The proper value for A is a function of the statistics of the channel power delay profile and variance.

In differing embodiments, A can be a predetermined value or be chosen for each data packet from a range of potential values (e.g., 8-16) based, for example, on the number of symbols whose power is above a threshold, such as a median value or median plus some percentage value. In simulations for an EDGE channel with the packet or data structure of FIG. 4 and typical urban channel characteristics, A=to 16 or 32 provided good results. Given the A high power symbols or estimated symbols, these are partitioned or separated into a set of high confidence and a set of lower confidence estimated symbols based on Euclidian distance from known symbols with each set sorted by power 707. More specifically the high power symbols or high power estimated symbols can be partitioned into a set of M high confidence estimated symbols, $I_m^{max}$, and a set of L lower confidence symbols or alternate estimated symbols, $I_l^{alt}$, with lower confidence based on Euclidean distance from the nearest symbol in the symbol constellation and with the elements of each set sorted according to their respective power.

M and L can vary from packet to packet based, e.g., on a threshold value for Euclidian distance to nearest symbol in the constellation or relative Euclidian distance to nearest versus next nearest symbol. For example, if the Euclidian distance to the nearest symbol is less that 30% (or other threshold value) of the Euclidian distance between two symbols in the constellation or alternatively if the Euclidian distance to the nearest symbol is 25% (or other chosen percentage) of the Euclidian distance to the next nearest symbol, the symbol can be part of the set of M high confidence estimated symbols. In either approach after selecting the M high confidence estimated symbols, the remaining high power estimated symbols can be the L alternate estimated symbols. Alternatively, M and L can be fixed at a predetermined value, e.g. 6 and 6 or 8 and 4 or the like, where M of the A high power estimated symbols with the smallest Euclidian distance to their nearest symbol are the M high confidence estimated symbols and the remaining L high power symbols are the alternate estimated symbols.

The sorting of the estimated symbols and selecting the plurality of high power estimated symbols, e.g., list of A high power estimated symbols and alternate estimated symbols for a portion of the high power estimated symbols can be represented by the following:

$$\underset{\substack{\text{sort} \\ \text{decision} \\ \text{region}}}{116} \{|I|^2\} \Rightarrow [I_0^{max}, I_1^{max}, I_2^{max}, \ldots, I_{M-2}^{max}, I_{M-1}^{max}, I_0^{alt}, \ldots I_l^{alt}, I_{L-1}^{alt}] \quad \text{Eq. 7}$$

From these A=M+L estimated symbols, various column vectors or matrixes $I_A$ can be formed where the elements of $I_A$ for a first matrix $I_{A1}$ are the set of high power symbols or plurality of high power symbols from the symbol constellation that are nearest to the respective estimated symbol in Eq. 7. In other words for the vector in Eq. 7 a hard decision is made for each of the M+L elements and this vector is the set of or plurality of high power symbols.

For each of the portion of the plurality of high power symbols, which portion can be the set of lower confidence estimated symbols, 709 shows determining, finding, or selecting, based on Euclidean distance from known symbols, a corresponding alternate symbol. Basically to form the set of high powered symbols a best guess as to the appropriate symbol from the constellation, i.e., closest known symbol, is made and then for lower confidence high power estimated symbols a next best guess for the appropriate symbol is made, i.e., an alternate symbol is selected.

Figure 8:
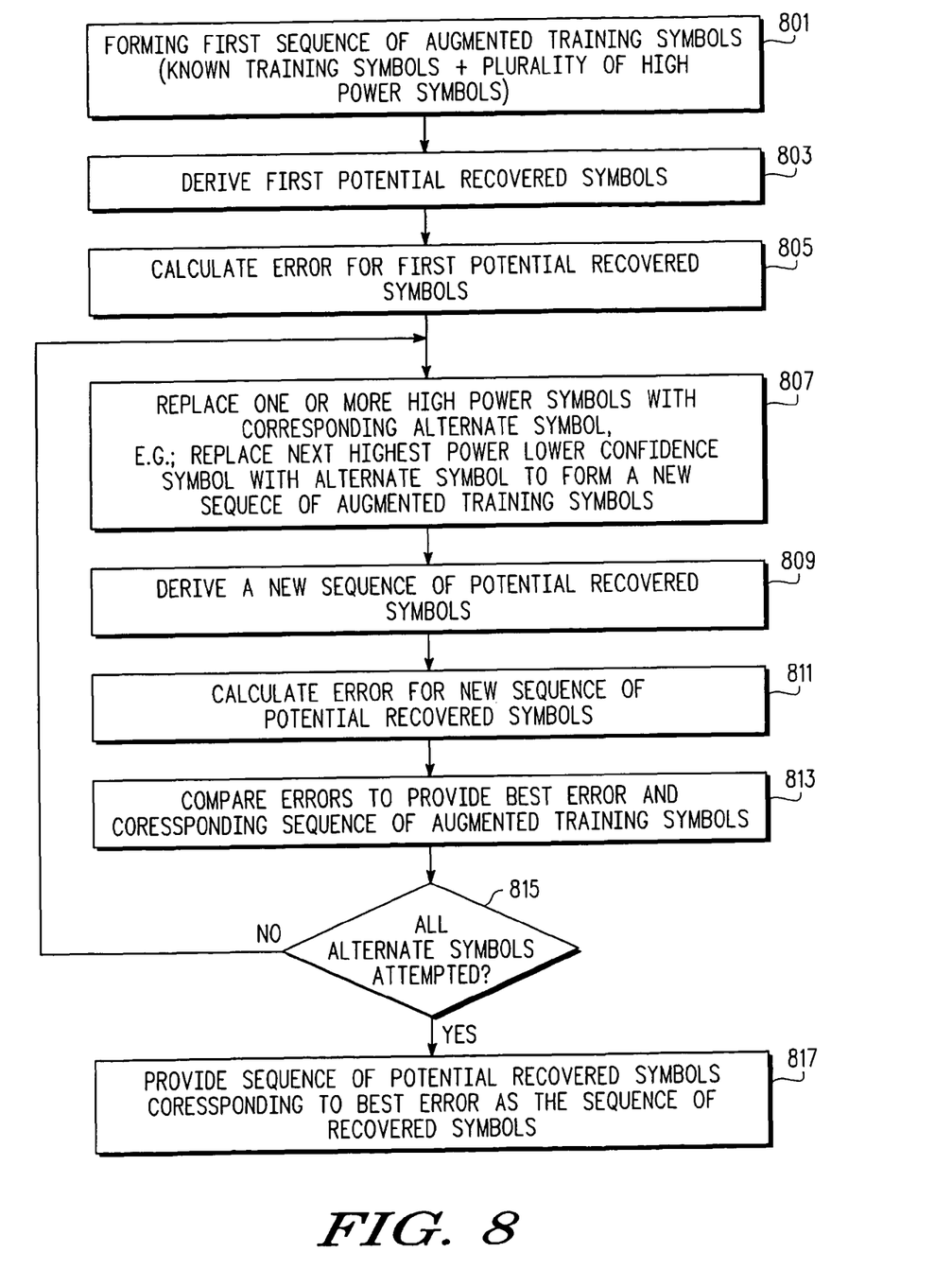
FIG. 8 shows a flow chart illustrating representative and more detailed methods associated with, e.g., the FIG. 5, methods of recovering symbols in a receiver in accordance with one or more embodiments.

Referring to FIG. 8, a flow chart illustrating representative and more detailed methods associated with, e.g., the FIG. 5, methods of recovering symbols in a receiver in accordance with one or more embodiments, will be discussed and described. More specifically, FIG. 8 illustrates a more detailed embodiments for deriving a sequence of recovered symbols. In overview, FIG. 8 illustrates deriving a sequence of recovered symbols corresponding to received samples based on the received samples and augmented training symbols, which further comprises iteratively deriving different sequences of potential recovered symbols using different sequences of augmented training symbols and selecting the sequence of recovered symbols from the different sequences of potential recovered symbols in accordance with an error function.

It will be appreciated that a sequence of augmented training symbols is formed 801, where the 32 known training symbols are augmented by the plurality of high power symbols, i.e., a column vector comprising the 32 known training symbols has the high power symbols added to it to provide a column vector having 32+A elements. Then potential recovered symbols are derived 803 using this sequence of augmented training symbols. This can be done using the following equation:

$$I_{pot} = [S_{0dr}^d | S_{1dr}^{fd}]_{116,2G} [[S_{0dr}^d | S_{1dr}^d]_{2G,32+A}^H [S_{0dr}^d | S_{1dr}^d]_{32+A,2G}]^{-1} [S_{0dr}^d | S_{1dr}^d]_{2G,32+A}^H \begin{bmatrix} T_{sc} \\ 32 \\ I_A \end{bmatrix} \quad \text{Eq. 8}$$

where it will be recognized this is a combination of Eq. 4 and Eq. 6. Eq. 4 has been changed to include an augmented training symbol sequence (column vector) and the sample matrix, $$[S_{0dr}^d | S_{1dr}^d]_{32+A,2G},$$

has been expanded to include the received samples corresponding to the $I_A$ estimated symbols or high power symbols. Using these, the calculation for the filter coefficients is repeated with the additional high power symbols and received samples. Given the filter coefficients, all 116 of the data samples and Eq. 6 are utilized to derive the sequence of possible or potential recovered symbols, $I_{pot}$.

An error term is then calculated 805. This can be done, for each of the 116 elements of $I_{pot}$, by finding the smallest Euclidian distance (magnitude) between an element or potential recovered symbol and the known symbols in the constellation, i.e., the best estimated symbol corresponding to each of the respective elements of $I_{pot}$ and then summing these magnitudes or magnitudes squared over the 116 elements to give an error value for $I_{pot}$. For an EDGE system with 8 known symbols, where the symbol constellation is each integer, m, multiple of $\pi/4$ which lies on a circle, this can be expressed as:

$$E^l = \left[ I_{116} - \exp\left(j \frac{2\pi}{8} m \right)_{116} \right] \Rightarrow I_{opt} = \min\{E^l\}, \quad \text{Eq. 9}$$

where each $I_{pot}$ will have an associated error vector $E^l$, and thus error or error value with the smaller error likely the better estimate for the symbol sequence. Thus, from a first sequence of augmented training symbols we have a first sequence of potential recovered symbols.

Other versions of $I_A$ can be formed by replacing one or more or some combination of the L lower confidence or alternate estimated symbols with the symbol from the symbol constellation that is the next nearest symbol to the respective alternate estimated symbol, i.e., an alternate symbol. The above processes can be repeated for all combinations of the alternate symbols and thus all sequences of augmented training symbols and finding or deriving all possible sequences of potential recovered symbols. An optimal sequence of recovered symbols can be found by choosing the sequence of potential recovered symbols with the smallest error (comparing all errors) as the sequence of recovered symbols.

FIG. 8 illustrates additional embodiments that can be less resource (processor, memory, etc.) intensive. At 807 replacing one or more high power symbols in the associated sequence of training symbols with their respective corresponding alternate symbol to form a second sequence of augmented training symbols is shown. In one embodiment, replacing the next highest power lower confidence symbol with its corresponding alternate symbol is performed, thus forming a new sequence of augmented training symbols. The first pass through the FIG. 8 process would result in the first (this is the next highest power) lower confidence symbol, i.e., known symbol corresponding to $I_0^{alt}$, in the first sequence of augmented training symbols being replaced with its alternate symbol, thereby forming a new or second sequence of augmented training symbols.

Given this new sequence of augmented training symbols, 809 indicates deriving a new sequence of potential recovered symbols, e.g., using Eq. 8. The reader will appreciate that nothing changes with the sample matrix or its various forms in Eq. 8 and thus only the last matrix multiplication process with the new augmented training symbol column vector is required. Calculating an error for the new sequence of potential recovered symbols, e.g., from Eq. 9, is shown at 811. At 813 comparing the errors is performed to provide a best error and corresponding or associated sequence of augmented training symbols and sequence of potential recovered symbols. For example, comparing a new error for the new sequence of potential recovered symbols with an old error for a previous sequence of potential recovered symbols derived using the first sequence of augmented training symbols is performed to provide a best error with the corresponding sequence of augmented training symbols and sequence of potential recovered symbols being retained for further use.

At 815 a check is made to see whether all alternate symbols have been attempted and if not, the process returns to 807 for replacing an additional high power symbol with a corresponding alternate symbol in the sequence of augmented training symbols that corresponds to the best error, e.g., the surviving sequence of augmented training symbols is further modified by replacing the next highest power lower confidence symbol with its alternate symbol. For the second pass through 807 the second (this is the next highest power) lower confidence symbol or the known symbol corresponding to $I_1^{alt}$, would be replaced with its alternate symbol. One of ordinary skill will appreciate that 807-813 will only be performed once for each of the alternate symbols, i.e., L times; rather than a number of times equal to all of the combinations and permutations of L alternate symbols. Thus the replacing 807, deriving 809, calculating an error 811 and comparing errors processes are repeated until all alternate symbols have been attempted, i.e., only one time for each alternate symbol. Depending on the error comparison 813, a particular alternate symbol may or may not be part of the surviving sequence of augmented training symbols and thus contribute to the surviving sequence of potential recovered symbols, i.e., the sequence of recovered symbols.

When the last alternate symbol has been attempted as determined by a yes outcome at 815, the process provides the surviving sequence of potential recovered symbols as the sequence of recovered symbols 817. Note that these symbols can be provided in soft form as calculated or in hard form by using the known symbol for each value or element, which was used for the error calculation. Other approaches for testing the alternate symbols could be used, e.g., ranking the L symbols from Eq. 7 from poorest to best confidence and sequentially attempting each.

Figure 9:
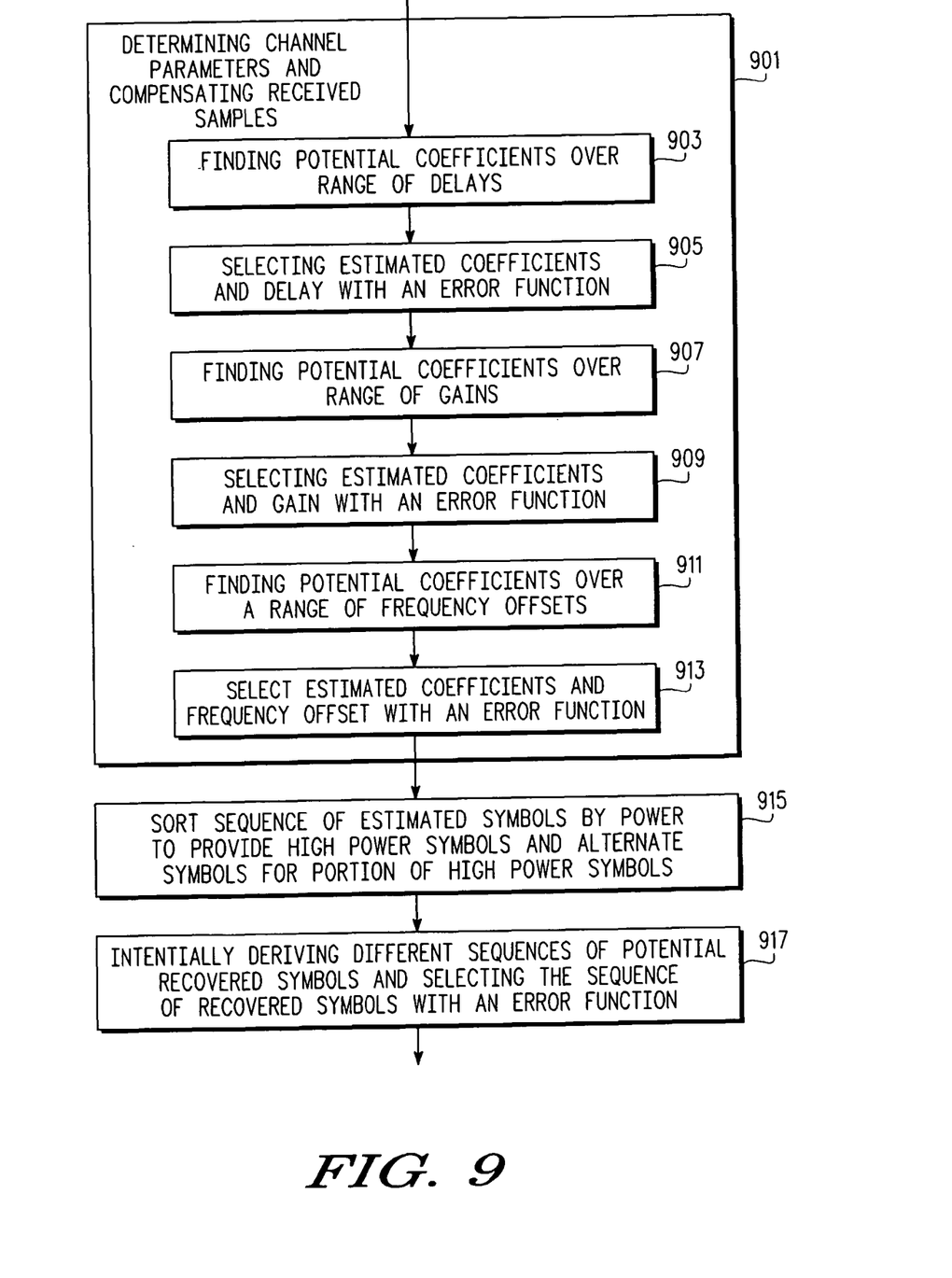
FIG. 9 illustrates a flow chart of representative methods of recovering symbols in accordance with one or more embodiments.

Referring to FIG. 9, a flow chart of representative methods of recovering symbols in accordance with one or more embodiments will be discussed and described. FIG. 9 is an extension of the FIG. 5 embodiment with more extensive channel parameter determination and compensation where many of the basic concepts have been covered in detail above or are readily extended from what has been discussed above and hence these discussions may be less extensive. When a packet or other unit of data has been received and sampled the process depicted in FIG. 9 can be used to provide recovered symbols. Initially 901 shows determining channel parameters associated with the received samples or more specifically the channel from which the samples resulted and compensating the received samples in accordance with the channel parameters. These channel parameters as noted above with reference to FIG. 2 and FIG. 3 can be one or more of a delay, a gain and a frequency offset.

Thus 901 illustrates or includes 903, 905, wherein determining a channel parameter comprises determining a delay. Determining the best delay and corresponding filter coefficients was discussed above, e.g., with reference to FIG. 6, Eq. 4, Eq. 5. The determining delay is performed assuming any gain or frequency offset is zero and includes finding potential coefficients for an interference cancellation filter for each delay of a range of delays using a corresponding portion of the received signal samples, with the corresponding portion of the received signal samples selected based on a respective delay and the known training symbols 903. Then 905 shows selecting, from the potential coefficients, the estimated coefficients for the interference cancellation filter in accordance with an error function, the estimated coefficients being a function of the delay. This provides the optimum or best delay and current best estimate for the filter coefficients and allows the appropriate samples to be selected and used for further calculations.

Further included with 901 are processes 907, 909 for determining a channel parameter that further comprises determining a gain. For these operations a delay equal to the optimum delay (appropriate samples are selected) and a zero frequency offset is utilized and gain is varied over a range of gains. Thus 909 illustrates finding potential coefficients for an interference cancellation filter for each gain of a range of gains using a corresponding portion of the received signal samples, the corresponding portion of the received signal samples based on the known training symbols. The filter coefficients for each gain over the range of gains (where a range can be +/−6 dB) is computed using samples time aligned with the training symbols that have been modified in accordance with each gain. The following equation which looks like Eq. 4 with the addition of the gain parameter denoted by $$\begin{bmatrix} g_0^\Delta \\ g_1^\Delta \end{bmatrix}_{2G} = \left[ [S_{0dr}^\Delta | S_{1dr}^\Delta]_{2G,32}^H [S_{0dr}^\Delta | S_{1dr}^\Delta]_{32,2G} \right]^{-1} [S_{0dr}^\Delta | S_{1dr}^\Delta]_{2G,32}^H \overline{T}_{sc_{32}} \quad \text{Eq. 10}$$

Given the different coefficient vectors, 909 shows selecting, from the potential coefficients, the estimated coefficients for the interference cancellation filter in accordance with an error function, the estimated coefficients being a function of the gain. This can include calculating a sequence of estimated symbols for each gain dependent coefficient vector from Eq. 10 and finding an error corresponding to each sequence and selecting the gain corresponding to the best error. This is represented by the following equations, which are the same form as Eq. 6 and Eq. 9 but showing the gain dependency:

$$I^\Delta = [S_{0dr}^\Delta | S_{1dr}^\Delta]_{116,2G} \begin{bmatrix} g_0^\Delta \\ g_1^\Delta \end{bmatrix}_{2G} \quad \text{Eq. 11}$$

$$E^\Delta = \left[ I_{116}^\Delta - \exp\left( j\frac{2\pi}{8}m \right)_{116} \right] \Rightarrow \Delta_{opt} = \min_\Delta \{E^\Delta\} \quad \text{Eq. 12}$$

Further included with 901 are processes 911, 913 wherein determining a channel parameter further comprises determining a frequency offset. For these processes a delay equal to the optimum delay (appropriate samples are selected) and a gain equal to optimum gain (samples modified in accordance with optimum gain) are utilized. First 911 shows finding potential coefficients for an interference cancellation filter for each frequency offset of a range of frequency offsets using a corresponding portion of the received signal samples, the corresponding portion of the received signal samples based on a respective frequency offset and the known training symbols. The samples are modified in accordance with one frequency offset (complex rotation) out of a range of frequency offsets. The range will depend on channel characteristics and relative motion of transmitter and receiver and reflectors but may be approximately two (2) hundred Hz at a carrier frequency of 1.8 Ghz and velocity of 200 kilometers per hour. Then 913 illustrates selecting, from the potential coefficients, the estimated coefficients for the interference cancellation filter in accordance with an error function, the estimated coefficients being a function of the frequency offset. This can include calculating a sequence of estimated symbols (Eq. 14 below) for each frequency dependent coefficient vector from Eq. 13 (below) and finding an error corresponding to each sequence and selecting the gain corresponding to the best error from Eq. 15 below. These processes can be performed using the following (by now familiar) equations with the frequency offset $f_d$ or dependency shown:

$$\begin{bmatrix} g_0^{f_d} \\ g_1^{f_d} \end{bmatrix}_{2G} = \left[ [S_{0dr}^{f_d} | S_{1dr}^{f_d}]_{2G,32}^H [S_{0dr}^{f_d} | S_{1dr}^{f_d}]_{32,2G} \right]^{-1} [S_{0dr}^{f_d} | S_{1dr}^{f_d}]_{2G,32}^H \overline{T}_{sc_{32}} \quad \text{Eq. 13}$$

$$I^{f_d} = [S_{0dr}^{f_d} | S_{1dr}^{f_d}]_{116,2G} \begin{bmatrix} g_0^{f_d} \\ g_1^{f_d} \end{bmatrix}_{2G} \quad \text{Eq. 14}$$

$$E^{f_d} = \left[ I_{116}^{f_d} - \exp\left( j\frac{2\pi}{8}m \right)_{116} \right] \Rightarrow f_{opt} = \min_{f_d} \{E^{f_d}\} \quad \text{Eq. 15}$$

FIG. 9 further illustrates 915 sorting the sequence of estimated symbols, which corresponds to the optimum frequency offset, by power, to provide high power symbols and alternate symbols for a portion of the high power symbols for use in forming augmented training symbols all as discussed above. Next 917 shows iteratively deriving different sequences of potential recovered symbols using different sequences of augmented training symbols and selecting the sequence of potential recovered symbols with the best error in accordance with an error function and providing this sequence as the sequence of recovered symbols.

Simulations of various embodiments of the above described methods, communication receivers and symbol recovery functions or demodulators have shown performance improvement of as much as 10 dB for a dual or diversity receiver using the above described techniques and typical urban channel characteristics.

It will be appreciated that the above described functions and structures may be implemented in one or more integrated circuits. For example, many or all of the functions can be implemented in digital signal processing circuitry as noted above.

The processes, apparatus, and systems, discussed above, and the inventive principles thereof are intended to and can improve symbol recovery over the processes used by prior art techniques. Using these principles of augmenting training symbols with high power or alternate symbols can quickly yield a lower symbol error rate or alternatively higher system capacity with relatively minimal costs and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of recovering symbols in a communication receiver, the method comprising:
sampling a received signal that includes interference to provide received samples;
determining a plurality of high power symbols and alternate symbols for a portion of the plurality of high power symbols based on the received samples and based on known training symbols; and
deriving a sequence of recovered symbols corresponding to the received samples based on the received samples and augmented training symbols, the augmented training symbols comprising the known training symbols augmented by the plurality of high power symbols with one or more alternate symbols replacing a corresponding one or more high power symbols.

2. The method of claim 1 wherein the determining a plurality of high power symbols and the determining alternate symbols further comprises;
  finding estimated coefficients for an interference cancellation filter based on a portion of the received samples and known training symbols, the portion of the received samples corresponding to the known training symbols;
  calculating estimated symbols based on the received samples and on the estimated coefficients; and
  selecting the plurality of high power symbols from the estimated symbols and selecting the alternate symbols for the portion of the plurality of high power symbols.

3. The method of claim 2 wherein the finding estimated coefficients further comprises:
  finding potential coefficients for an interference cancellation filter for each delay of a range of delays using a corresponding portion of the received samples, the corresponding portion of the received samples based on a respective delay and the known training symbols; and
  selecting, from the potential coefficients, the estimated coefficients for the interference cancellation filter in accordance with an error function.

4. The method of claim 1 further comprising determining a channel parameter associated with the received samples and compensating the received samples in accordance with the channel parameter.

5. The method of claim 4 wherein the determining a channel parameter further comprises determining a delay including:
  finding potential coefficients for an interference cancellation filter for each delay of a range of delays using a corresponding portion of the received samples, the corresponding portion of the received samples based on a respective delay and the known training symbols; and
  selecting, from the potential coefficients, the estimated coefficients for the interference cancellation filter in accordance with an error function, the estimated coefficients being a function of the delay.

6. The method of claim 4 wherein the determining a channel parameter further comprises determining a gain including:
  finding potential coefficients for an interference cancellation filter for each gain of a range of gains using a corresponding portion of the received samples, the corresponding portion of the received samples based on the known training symbols; and
  selecting, from the potential coefficients, the estimated coefficients for the interference cancellation filter in accordance with an error function, the estimated coefficients being a function of the gain.

7. The method of claim 4 wherein the determining a channel parameter further comprises determining a frequency offset including:
  finding potential coefficients for an interference cancellation filter for each frequency offset of a range of frequency offsets using a corresponding portion of the received samples, the corresponding portion of the received samples based on a respective frequency offset and the known training symbols; and
  selecting, from the potential coefficients, the estimated coefficients for the interference cancellation filter in accordance with an error function, the estimated coefficients being a function of the frequency offset.

8. The method of claim 1 wherein the determining a plurality of high power symbols further comprises:
  finding estimated coefficients for an interference cancellation filter, the estimated coefficients based on a corresponding best delay;
  calculating a sequence of estimated symbols based on the received samples and the estimated coefficients; and
  sorting, based on power, the sequence of estimated symbols to provide the plurality of high power symbols.

9. The method of claim 8 wherein the determining alternate symbols for a portion of the plurality of high power symbols further comprises: for each of the portion of the plurality of high power symbols, finding, based on Euclidean distance from known symbols, a corresponding alternate symbol.

10. The method of claim 1 wherein the deriving a sequence of recovered symbols corresponding to the received samples based on the received samples and augmented training symbols, further comprises iteratively deriving different sequences of potential recovered symbols using different sequences of augmented training symbols and selecting the sequence of recovered symbols from the different sequences of potential recovered symbols in accordance with an error function.

11. The method of claim 10 further comprising:
  replacing one or more high power symbols in a first sequence of augmented training symbols with a corresponding one or more alternate symbols to form a second sequence of augmented training symbols; and
  deriving a new sequence of potential recovered symbols using the second sequence of augmented training symbols.

12. The method of claim 11 further comprising:
  comparing a new error for the new sequence of potential recovered symbols with an old error for a previous sequence of potential recovered symbols derived using the first sequence of augmented training symbols to provide a best error;
  replacing an additional high power symbol with a corresponding alternate symbol in a sequence of augmented training symbols that corresponds to the best error; and
  repeating the deriving, comparing, and replacing processes until all alternate symbols have been attempted.

13. The method of claim 1 wherein the sampling a received signal that includes interference to provide received samples further comprises sampling a received signal from a plurality of receivers to provide the received samples with samples from each of the plurality of receivers.

14. A communication receiver configured to recover symbols from a radio frequency signal that includes interference, the communication receiver comprising:
  one or more receiver front ends configured to provide, respective, received signals with interference, the received signals corresponding to the radio frequency signal;
  one or more sampler functions coupled, respectively, to the one or more receiver front ends, and configured to sample the, respective, received signals and provide received samples from each of the one or more receiver front ends; and
  a demodulator configured for:
  determining a plurality of high power symbols and determining alternate symbols for a portion of the plurality of high power symbols based on the received samples and based on known training symbols; and
  deriving a sequence of recovered symbols corresponding to the received samples based on the received samples and augmented training symbols, the augmented training symbols comprising the known training symbols augmented by the plurality of high power symbols with one or more alternate symbols replacing a corresponding one or more high power symbols.

15. The communication receiver of claim 14 wherein the demodulator configured for determining a plurality of high power symbols and the determining alternate symbols is further configured for:

finding estimated coefficients for an interference cancellation filter based on a portion of the received samples and known training symbols, the portion of the received samples corresponding to the known training symbols;

calculating estimated symbols based on the received samples and on the estimated coefficients; and selecting the plurality of high power symbols from the estimated symbols and selecting the alternate symbols for the portion of the plurality of high power symbols.

16. The communication receiver of claim 15 wherein the demodulator further configured for finding estimated coefficients is further configured for:

finding potential coefficients for an interference cancellation filter for each delay of a range of delays using a corresponding portion of the received samples, the corresponding portion of the received samples based on a respective delay and the known training symbols; and selecting, from the potential coefficients, the estimated coefficients for the interference cancellation filter in accordance with an error function.

17. The communication receiver of claim 14 wherein the demodulator configured for determining a plurality of high power symbols and determining alternate symbols for a portion of the plurality of high power symbols is further configured for:

finding estimated coefficients for an interference cancellation filter, the estimated coefficients based on a corresponding best delay;

calculating a sequence of estimated symbols based on the received samples and the estimated coefficients;

sorting, based on power, the sequence of estimated symbols to provide the plurality of high power symbols; and finding, for each of the portion of the plurality of high power symbols, a corresponding alternate symbol based on Euclidean distance from known symbols.

18. The communication receiver of claim 14 wherein the demodulator configured for deriving a sequence of recovered symbols corresponding to the received samples based on the received samples and augmented training symbols, is further configured for iteratively deriving different sequences of potential recovered symbols using different sequences of augmented training symbols and selecting the sequence of recovered symbols from the different sequences of potential recovered symbols in accordance with an error function.

19. The communication receiver of claim 18 wherein the demodulator is further configured for:

replacing one or more high power symbols in a first sequence of augmented training symbols with a corresponding one or more alternate symbols to form a second sequence of augmented training symbols; and deriving a new sequence of potential recovered symbols using the second sequence of augmented training symbols.

20. The communication receiver of claim 19 wherein the demodulator is further configured for:

comparing a new error for the new sequence of potential recovered symbols with an old error for a previous sequence of potential recovered symbols derived using the first sequence of augmented training symbols to provide a best error;

replacing an additional high power symbol with a corresponding alternate symbol in a sequence of augmented training symbols that corresponds to the best error; and repeating the deriving, comparing, and replacing processes until all alternate symbols have been attempted.

* * * * *